(12) United States Patent
Liu

(10) Patent No.: US 9,773,573 B2
(45) Date of Patent: Sep. 26, 2017

(54) PRESSURIZED WATER REACTOR FUEL ASSEMBLY

(71) Applicant: Westinghouse Electric Company LLC, Cranberry Township, PA (US)

(72) Inventor: Jin Liu, Elgin, SC (US)

(73) Assignee: Westinghouse Electric Company LLC, Cranberry Township, PA (US)

( * ) Notice: Subject to any disclaimer, the term of this patent is extended or adjusted under 35 U.S.C. 154(b) by 806 days.

(21) Appl. No.: 14/495,957

(22) Filed: Sep. 25, 2014

(65) Prior Publication Data

US 2016/0093407 A1     Mar. 31, 2016

(51) Int. Cl.
    G21C 7/20      (2006.01)
    G21C 3/322     (2006.01)
    G21C 3/326     (2006.01)
    G21C 1/32      (2006.01)
    G21C 7/117     (2006.01)

(52) U.S. Cl.
    CPC ............... *G21C 7/20* (2013.01); *G21C 3/322* (2013.01); *G21C 3/326* (2013.01); *G21C 1/322* (2013.01); *G21C 7/117* (2013.01); *Y02E 30/32* (2013.01); *Y02E 30/38* (2013.01)

(58) Field of Classification Search
    CPC ... G21C 3/00; G21C 3/30; G21C 3/32; G21C 3/33; G21C 3/3305; G21C 3/3315; G21C 3/331
    See application file for complete search history.

(56) References Cited

U.S. PATENT DOCUMENTS

| 5,178,822 A * | 1/1993 | Buford, III | C23G 1/00 122/379 |
| 7,515,674 B2 | 4/2009 | Sparrow et al. | |
| 2002/0015465 A1* | 2/2002 | Brosset | G21C 3/334 376/409 |
| 2007/0177711 A1 | 8/2007 | Yamada et al. | |
| 2009/0252281 A1 | 10/2009 | Sparrow et al. | |
| 2011/0216873 A1 | 9/2011 | Evans et al. | |
| 2013/0272483 A1* | 10/2013 | Russell | G21C 3/10 376/451 |

FOREIGN PATENT DOCUMENTS

| JP | 2000-028770 | 1/2000 |
| KR | 10-1032867 | 5/2011 |

OTHER PUBLICATIONS

Westinghouse Electric Company LLC, PCT/US20151050081 Search Report, dated Apr. 15, 2016, 10 pages.

* cited by examiner

*Primary Examiner* — Marshall P O'Connor
(74) *Attorney, Agent, or Firm* — Eckert Seamans Cherin & Mellott, LLC; Daniel C. Abeles

(57) ABSTRACT

An elongated control rod guide thimble for a nuclear reactor having a tube-in-tube dashpot design that has circumferential slots in the dashpot walls that align with spaced openings in the guide thimble sheath. The dashpot tube has an end plug with a threaded opening extending axially therethrough which is captured by a thimble screw that extend through an opening in the bottom nozzle and sandwiches an end plug attached to the guide thimble sheath between the dashpot tube end plug and the bottom nozzle.

14 Claims, 5 Drawing Sheets

PRESSURIZED WATER REACTOR FUEL ASSEMBLY

BACKGROUND

1. Field

The present invention relates generally to nuclear reactors, and more particularly, to nuclear fuel assemblies that employ guide thimbles with tube-in-tube dashpots.

2. Related Art

In a nuclear reactor for power generation, such as a pressurized water reactor, heat is generated by fission of a nuclear fuel such as enriched uranium, and transferred into a coolant flowing through a reactor core. The core contains elongated nuclear fuel rods mounted in proximity with one another in a fuel assembly structure, through and over which the coolant flows. The fuel rods are spaced from one another in co-extensive parallel arrays. Some of the neutrons and other atomic particles released during nuclear decay of the fuel atoms in a given fuel rod pass through the spaces between fuel rods and impinge upon fissile material in adjacent fuel rods, contributing to the nuclear reaction and to the heat generated by the core.

Movable control rods are dispersed through the nuclear core to enable control over the overall rate of the fission reaction, by absorbing a portion of the neutrons, which otherwise would contribute to the fission reaction. The control rods generally comprise elongated rods of neutron absorbing material and fit into longitudinal openings or guide thimbles in the fuel assemblies running parallel to and between the fuel rods. Inserting a control rod further into the core causes more neutrons to be absorbed without contributing to the fission process in an adjacent fuel rod; and retracting the control rods reduces the extent of neutron absorption and increases the rate of a nuclear reaction and the power output of the core.

FIG. 1 shows the schematic of a simplified conventional pressurized water nuclear reactor primary system, including a generally cylindrical pressure vessel 10 having a closure head 12 enclosing a nuclear core 14 that supports the fuel rods containing the fissile material. A liquid coolant, such as water or borated water, is pumped into the vessel 10 by pump 16, through the core 14 where heat energy is absorbed and is discharged to a heat exchanger 18 typically referred to as a steam generator, in which heat is transferred to a utilization circuit (not shown) such as a steam driven turbine generator. The reactor coolant is then returned to the pump 16 completing the primary loop. Typically, a plurality of the above described loops are connected to a single reactor vessel 10 by reactor coolant piping 20. One of the loops includes a pressurizer 22 for controlling the pressure in the reactor primary system.

Commercial power plants employing this design are typically on the order of 1,100 megawatts or more. More recently, Westinghouse Electric Company LLC has proposed a small modular reactor in the 200 megawatt class. The small modular reactor is an integral pressurized water reactor with all primary loop components located inside the reactor vessel. The reactor vessel is, in turn, surrounded by a compact, high pressure containment. Due to both the limited space within the containment and the low cost requirement for integral pressurized light water reactors, the overall number of auxiliary systems needs to be minimized without compromising safety or functionality. For that reason, it is desirable to maintain most of the components in fluid communication with the primary loop of the reactor system within the compact, high pressure containment.

In the processes for designing the small modular reactor, one of the fuel/core design requirements for the small modular reactor is that the reactor should have load follow capability while minimizing CVS duty, i.e., Chemical and Volume Shim system duty, which adds and removes Boron to control reactivity. In order to satisfy this requirement, a group of gray rod cluster assemblies will be moved up and down within the fuel assemblies during reactor operation to control reactivity to satisfy load follow requirements. Proper cooling of the gray rods becomes critical to ensure the safe operation of the reactor and protect the gray rods from overheating. One of the design options to keep the control rods from overheating is to form side holes in the control rod guide thimble cladding (also referred to hereafter as the sheath) near the thimble assembly end plugs. This design choice is not a problem for the integral dashpot tube designs. However, the tube-in-tube dashpot designs make it more difficult to implement this design choice because the inside dashpot assembly has to be designed such that there will be through holes existing after assembling the dashpot tube within the guide thimble tube, regardless of the installation orientation of the dashpot tube.

Accordingly, a new tube-in-tube dashpot and thimble tube assembly design is desired that will provide adequate cooling without complicating manufacture.

SUMMARY

These and other objects are achieved by a nuclear fuel assembly design that has a top nozzle, a bottom nozzle and a plurality of elongated guide thimble tubes extending axially between and attached to the top nozzle and the bottom nozzle. At least some of the plurality of guide tubes have a tubular sheath that extends substantially the entire length of the corresponding guide tube with a lower end of the sheath capped by a lower end plug having an aperture extending axially therethrough. A tube-in-tube dashpot having an axially extending sidewall is disposed within a lower portion of the tubular sheath with an opening in the sidewall of the dashpot aligned with an opening in the tubular sheath.

In one embodiment, the tube-in-tube dashpot has a lower end cap with an aperture extending axially therethrough that aligns with the aperture in the lower end plug of the tubular sheath. The elongated guide thimbles are connected to the bottom nozzle by a fastener that extends through the bottom nozzle, through the lower end plug of the tubular sheath and into the lower end cap in the tube-in-tube dashpot, attaching the guide thimble and the tube-in-tube dashpot to the bottom nozzle. In one embodiment the aperture in the lower end cap of the tube-in-tube dashpot is threaded and mates with a corresponding thread on the fastener.

Preferably, the opening in one of the sidewall of the dashpot or the tubular sheath is oblong, extending partially around a circumference thereof with the larger diameter of the oblong opening extending in the circumferential direction. Desirably, the opening in the one of the sidewall or the tubular sheath comprises a plurality of circumferentially spaced oblong openings formed approximately at the same elevation. In one preferred embodiment, the openings in the one of the sidewall or the tubular sheath comprises two circumferentially spaced oblong openings formed approximately at the same elevation. Preferably, the two circumferentially spaced oblong openings extend substantially around the entire circumference of the one of the sidewall or tubular sheath and are spaced from one another by a distance substantially required to assure the structural integrity of the one of the tube-in-tube dashpot sidewall or tubular sheath. In one such embodiment, the opening in the other of the tubular sheath or the side wall is circular and overlaps a portion of the oblong opening in the one of the sidewall of the tube-in-tube dashpot or the tubular sheath.

BRIEF DESCRIPTION OF THE DRAWINGS

A further understanding of the invention can be gained from the following description of the preferred embodiments when read in conjunction with the accompanying drawings in which.

DESCRIPTION OF THE PREFERRED EMBODIMENT

Figure 1:
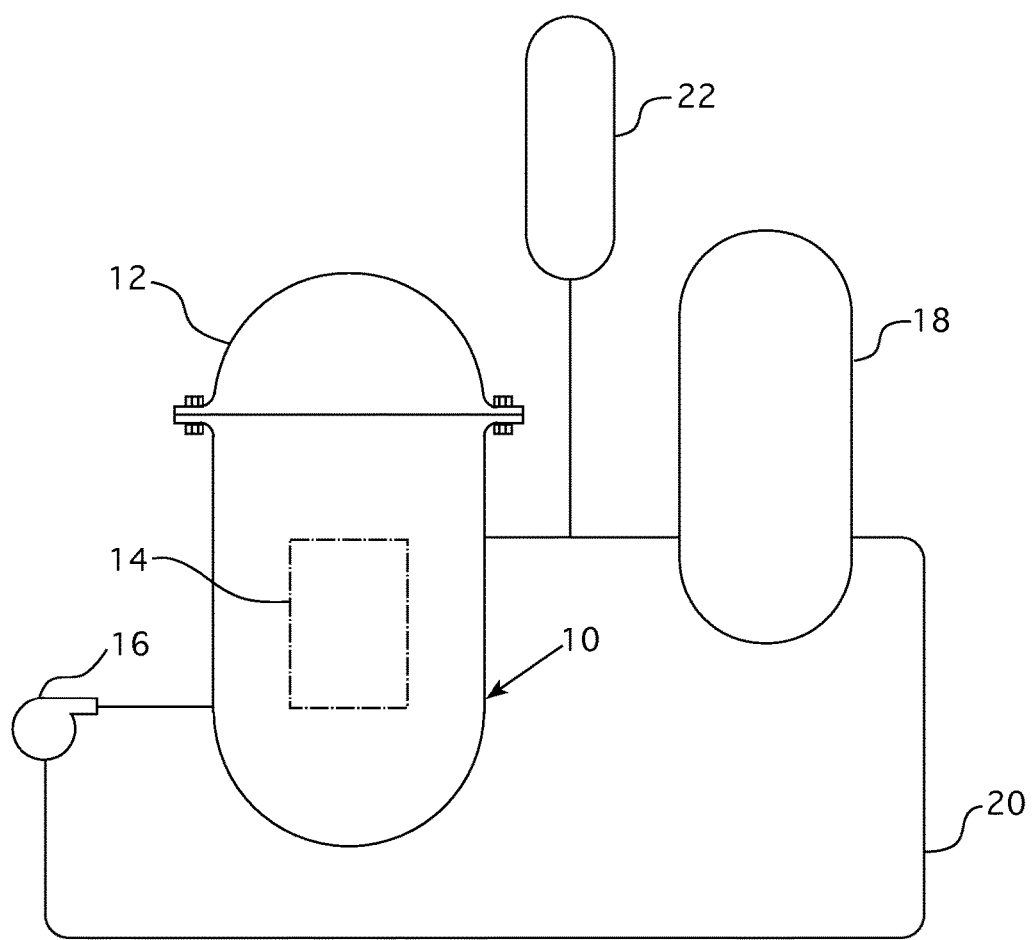
FIG. 1 is a simplified schematic of a conventional nuclear reactor system.
Figure 2:
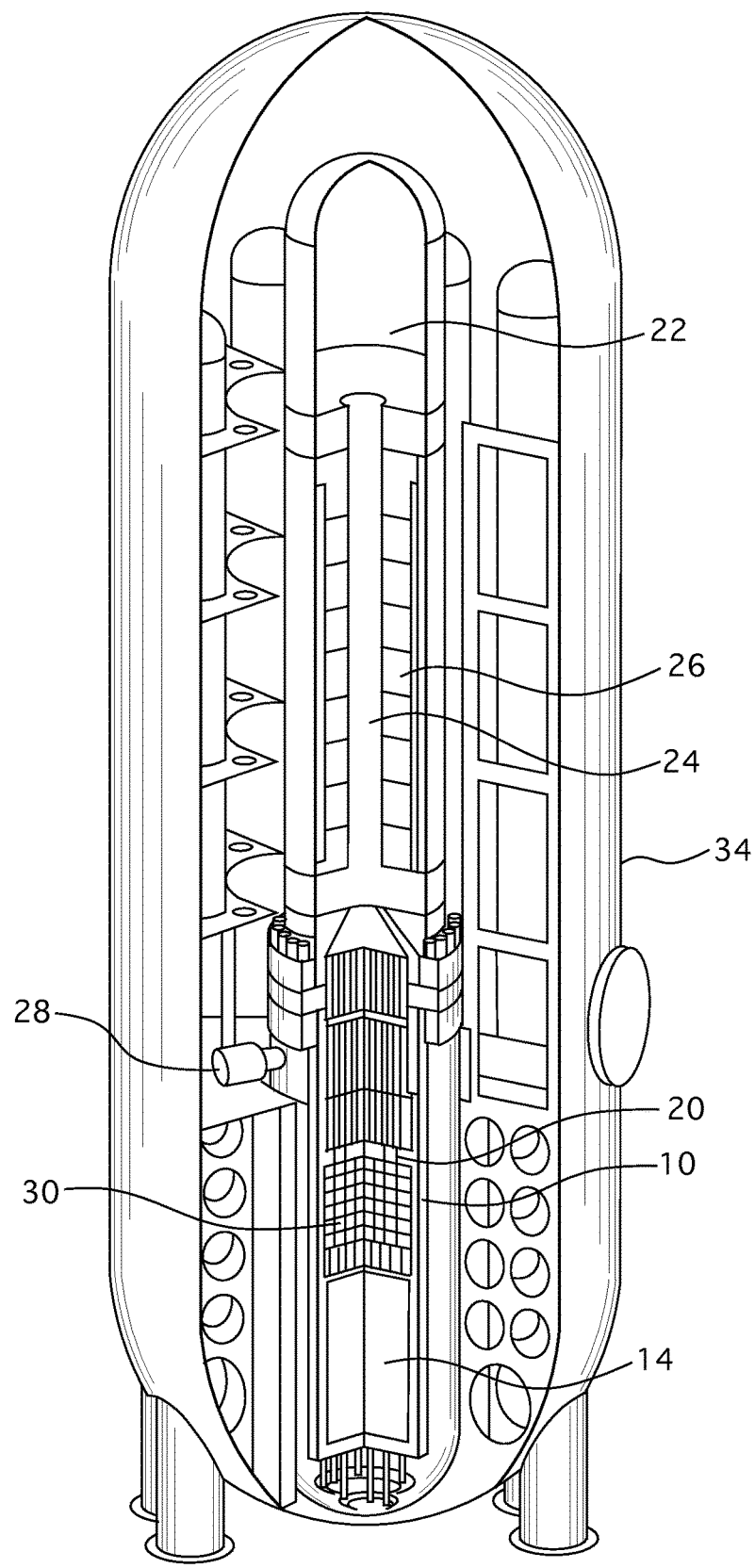
FIG. 2 is a perspective view, partially cut away, showing a small modular integral reactor system to which this invention can be applied.
Figure 3:
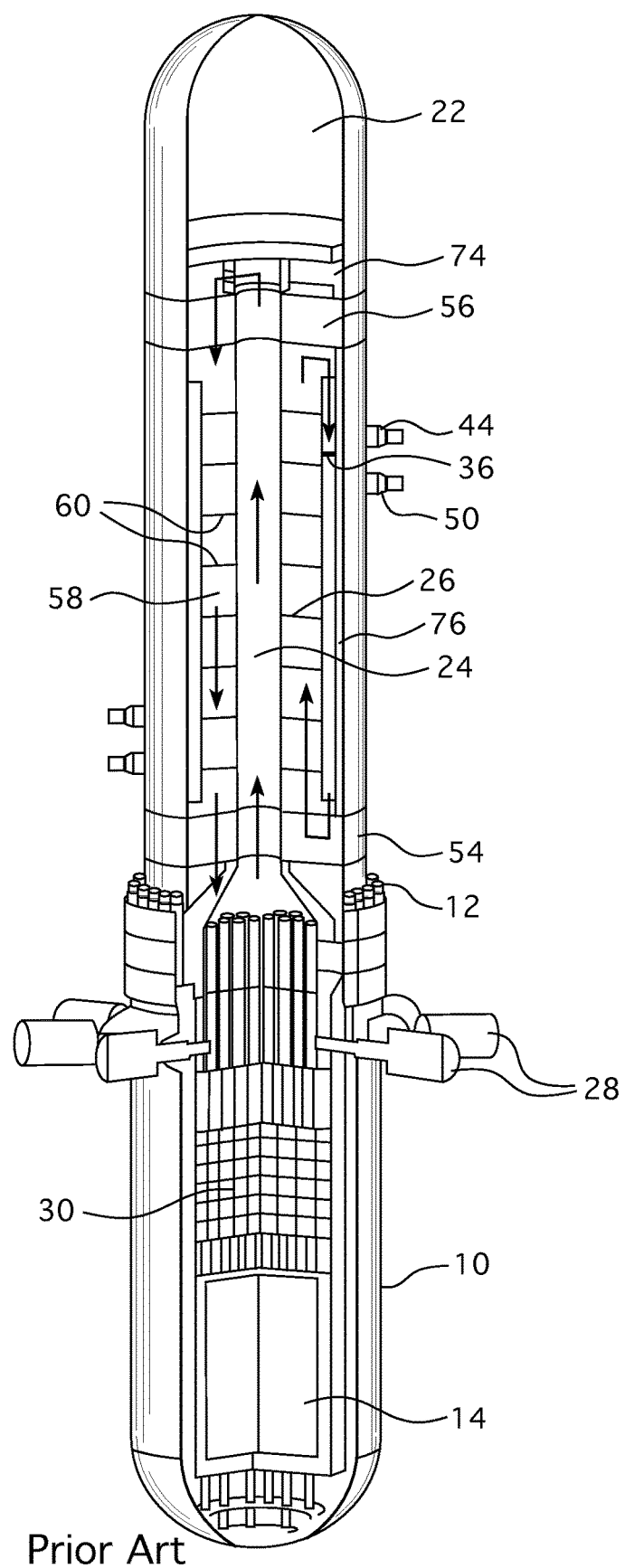
FIG. 3 is an enlarged view of the reactor shown in FIG. 2.

FIGS. 2 and 3 illustrate a small modular reactor design which can benefit from the guide thimble design principles of this invention. FIG. 2 shows a perspective view of the reactor containment of a modular reactor design to which this invention can be applied. The reactor containment illustrated in FIG. 2 is partially cut away, to show the reactor pressure vessel and its integral, internal components. FIG. 3 is an enlarged view of the reactor pressure vessel shown in FIG. 2. Like reference characters are used among the several figures to identify corresponding components.

In an integral pressurized water reactor such as illustrated in FIGS. 2 and 3, substantially all the components typically associated with the primary side of a nuclear steam supply system are contained in a single reactor pressure vessel 10 that is typically housed within a high pressure containment vessel 34 capable of withstanding pressures of approximately 250 psig, along with portions of the safety systems associated with the primary side of the nuclear steam supply system. The primary system components housed within the reactor pressure vessel 10 include the primary side of a steam generator 26, reactor coolant pumps 28, a pressurizer 22 and the reactor itself having a core 14 and upper internals structure 30. The steam generator system 18 of a commercial reactor, in this integral reactor design, is separated into two components, a heat exchanger 26 which is located in the reactor vessel 10 above the reactor upper internals 30 and a steam drum which is maintained external to the containment 34 and described more fully in application Ser. No. 13/495, 050, filed Jun. 13, 2012. The steam generator heat exchanger 26 includes within the pressure vessel 10/12, which is rated for primary design pressure and is shared with the reactor core 14 and other conventional reactor internal components, two tube sheets 54 and 56, hot leg piping 24 (also referred to as the hot leg riser), heat transfer tubes 58 which extend between the lower tube sheet 54 and the upper tube sheet 56, tube supports 60, secondary flow baffles 36 for directing the flow of the secondary fluid medium among the heat transfer tubes 58 and secondary side flow nozzles 44 and 50. The heat exchanger 26 within the pressure vessel head assembly 12 is thus sealed within the containment 34.

The flow of the primary reactor coolant through the heat exchanger 26 in the head 12 of the vessel 10 is shown by the arrows in the upper portion of FIG. 3. As shown, heated reactor coolant exiting the reactor core 14 travels up and through the hot riser leg 24, through the center of the upper tube sheet 56 where it enters a hot leg manifold 74 where the heated coolant makes a 180° turn and enters the heat transfer tubes 58 which extend through the upper tube sheet 56. The reactor coolant then travels down through the heat transfer tubes 58 that extend through the lower tube sheet 54 transferring its heat to a mixture of recirculated liquid and feed water that is entering the heat exchanger through the sub-cooled recirculation input nozzle 50 from the external steam drum, in a counter flow relationship. The sub-cooled recirculating liquid and feed water that enters the heat exchanger 26 through the sub-cooled recirculation input nozzle 50 is directed down to the bottom of the heat exchanger by the secondary flow baffles 36 and up and around heat exchange tubes 58 and turns just below the upper tube sheet 56 into an outlet channel 76 where the moisture laden steam is funneled to the wet steam outlet nozzle 44. The wet saturated steam is then conveyed to the external steam drum where it is transported through moisture separators which separate the steam from the moisture. The separated moisture forms the recirculated liquid which is combined with feed water and conveyed back to the sub-cooled recirculation input nozzle 50 to repeat the cycle.

Figure 4:
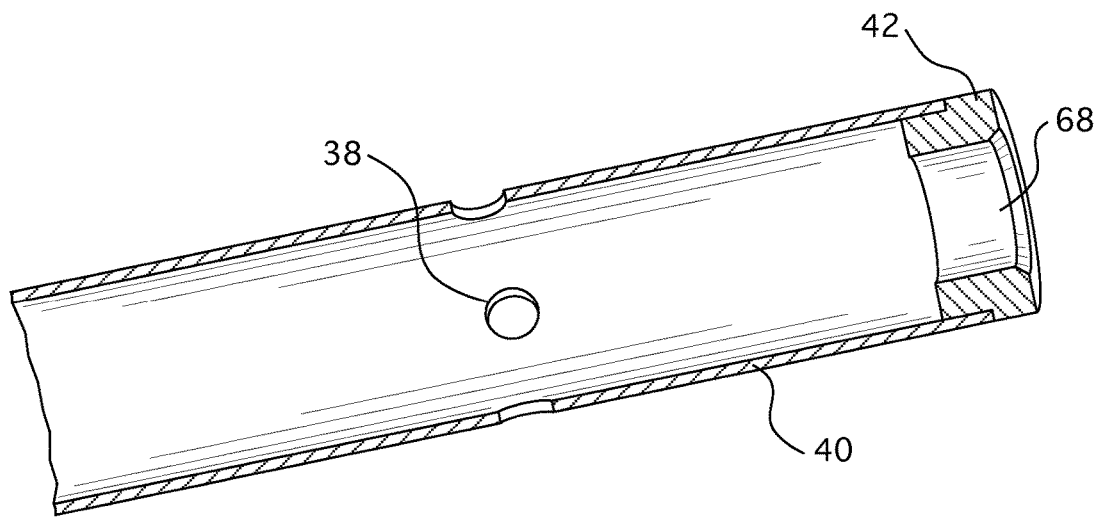
FIG. 4 is a sectional view of the lower end of a control rod guide thimble without the dashpot assembly in place, showing a flow hole through the thimble sheath.
Figure 5:
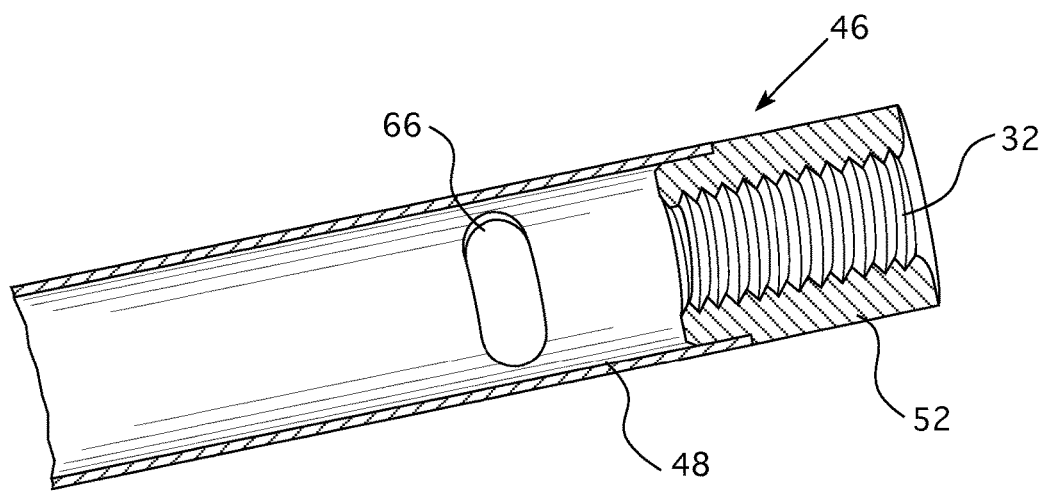
FIG. 5 is a sectional view of a lower dashpot assembly with circumferentially extending side slots in accordance with one embodiment of this invention.
Figure 6:
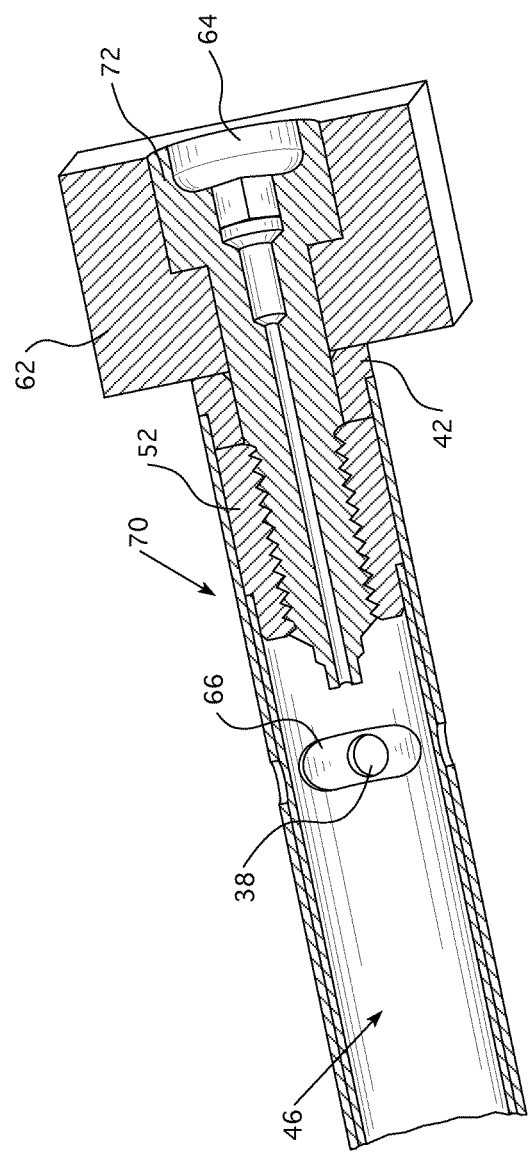
FIG. 6 is a sectional view of a guide thimble incorporating one embodiment of this invention, attached to a portion of a lower nozzle with the dashpot assembly in place.

This invention provides a new guide thimble assembly that employs a tube-in-tube dashpot design that enables enhanced cooling of the control rods and gray rods as they are moved within and out of the core to accommodate load follow. One exemplary embodiment which is specifically suited for small modular reactor fuel assemblies is illustrated in FIGS. 4, 5 and 6, though it should be appreciated that the same design is suitable for large scale reactors such as the AP1000® reactor offered by Westinghouse Electric Company LLC, Cranberry Township, Pennsylvania. The embodiment illustrated in FIGS. 4, 5 and 6 employs a tube-in-tube dashpot tube with side slots that has an end plug welded to its lower end with a threaded opening 68 extending through the bottom of the end plug. FIG. 4 is a sectional view of the lower portion of a thimble tube sheath 40 that is capped at its lower end with an annular end plug 42 that is welded to the sheath. Coolant enters the control rod guide thimble sheath 40 from the bottom nozzle, through the through the thimble screw center hole 64 shown in FIG. 6, to cool the control rods that are reciprocally movable within the thimble tube sheath 40. Side hole openings 38 in the sheath that communicate with corresponding openings in the dashpot tube provide additional coolant flow into the dashpot to enhance cooling of the gray rods or controls rods that are reciprocally movable within the sheath. The dimensions and the number of the holes/slots provided in the sheath 40 and the dashpot tube 48 are designed such that there will be at least X number of the through holes in alignment through the side of the thimble tube after assembling the dashpot tube and the thimble tube regardless of the orientation of the installed dashpot tube. This X number of through holes is determined by a thermal hydraulic analysis and may be less than the number of openings in the outer sheath or the dashpot tube wall.

FIG. 5 shows the dashpot assembly 46 formed from a tubular member 48 that has an end plug 52 welded to a lower end, with a threaded opening 32 extending through the end plug into the interior of the dashpot tube. FIG. 6 shows a cross sectional view of the thimble tube assembly 70 connected to a portion of the bottom nozzle 62 with a thimble screw 64 that extends through an opening 72 in the bottom nozzle, through the thimble tube sheath end plug 42 and into the threaded opening 32 in the dashpot end plug 52. This embodiment of the design uses one or more oblong slots 66 in either the dashpot or the thimble tube sheath to align with the generally circular opening 38 in the other of the thimble tube sheath 40 or the dashpot. Four hole openings are drilled at approximately 90° apart in the thimble tube sheath 40 in this exemplary embodiment. The dashpot has two circumferentially extending oblong slots that are cut approximately 180° apart along the circumference of the dashpot tube 48 as shown in FIG. 5. The integrated tube-in-tube guide thimble assembly 70 and a portion of the bottom nozzle top plate 62 through which the thimble screw 64 extends is shown in FIG. 6. The integrated tube-in-tube guide thimble assembly is assembled in such a way that the guide thimble tube/assembly is sandwiched in between the dashpot assembly and the bottom nozzle top plate by the thimble screw as shown in FIG. 6. The design of the slot dimensions and positions ensure that orientation of the installed dashpot tube will not significant impact the flow of coolant into the dashpot with at least two through holes aligned for proper cooling. It should be appreciated that the number of hole openings in the outer sheath 40 and the number of slots 66 in the dashpot tube may vary without departing from the concepts claimed hereafter. Similarly, circumferentially extending oblong openings may be provided in both the guide tube sheath and the dashpot sidewall without departing from the concepts claimed hereafter. Accordingly, this arrangement provides enhanced cooling for gray rods or control rods while employing a tube-in-tube dashpot design. It should also be recognized that the concepts taught herein are applicable to any other guide tube such as those that guide water displacement rods that employ tube-in-tube dashpots and require enhanced cooling.

While specific embodiments of the invention have been described in detail, it will be appreciated by those skilled in the art that various modifications and alternatives to those details could be developed in light of the overall teachings of the disclosure. Accordingly, the particular embodiments disclosed are meant to be illustrative only and not limiting as to the scope of the invention which is to be given the full breadth of the appended claims and any and all equivalents thereof.

What is claimed is:

1. A nuclear fuel assembly comprising:
   a top nozzle;
   a bottom nozzle;
   a plurality of elongated guide thimbles extending axially between and attached to the top nozzle and the bottom nozzle, at least some of the plurality of guide thimbles having a tubular sheath that extends a majority of the length of the corresponding guide thimble with a lower end of the sheath capped by a lower end plug having an aperture extending axially there through; and
   a tube-in-tube dashpot having an axially extending sidewall disposed within a lower portion of the tubular sheath with an opening in the sidewall of the dashpot aligned with an opening in the tubular sheath, wherein the opening in one of the sidewall of the dashpot or the tubular sheath is oblong extending partially around a circumference of the one of the sidewall or the tubular sheath with a greater diameter of the oblong opening extending in the circumferential direction.

2. The nuclear fuel assembly of claim 1 wherein the tube-in-tube dashpot has a lower end cap with an aperture extending axially there through which aligns with the aperture in the lower end plug of the tubular sheath.

3. The nuclear fuel assembly of claim 2 including a fastener that extends through the bottom nozzle, through the lower end plug of the tubular sheath and into the lower end cap of the tube-in-tube dashpot, attaching the guide thimble and the tube-in-tube dashpot to the bottom nozzle.

4. The nuclear fuel assembly of claim 3 wherein the aperture in the lower end cap of the tube-in-tube dashpot is threaded and mates with a corresponding thread on the fastener.

5. The nuclear fuel assembly of claim 1 wherein the opening in the one of the sidewall or the tubular sheath comprises a plurality of circumferentially spaced oblong openings formed approximately at the same elevation.

6. The nuclear fuel assembly of claim 5 wherein the opening in the one of the sidewall or the tubular sheath comprises two circumferentially spaced oblong openings formed approximately at the same elevation.

7. The nuclear fuel assembly of claim 1 wherein the opening in the other of the tubular sheath or the sidewall is circular and overlaps a portion of the oblong opening in the one of the sidewall of the tube-in-tube dashpot or the tubular sheath.

8. A modular reactor having a primary circuit substantially contained within a pressure vessel that houses a core comprising fuel assemblies at least some of which include:
   a top nozzle;
   a bottom nozzle;
   a plurality of elongated guide thimbles extending axially between and attached to the top nozzle and the bottom nozzle, at least some of the plurality of guide thimbles having a tubular sheath that extends a majority of the length of the corresponding guide thimble with a lower end of the sheath capped by a lower end plug having an aperture extending axially there through; and
   a tube-in-tube dashpot having an axially extending sidewall disposed within a lower portion of the tubular sheath with an opening in the sidewall of the dashpot aligned with an opening in the tubular sheath, wherein the opening in one of the sidewall of the dashpot or the tubular sheath is oblong extending partially around a circumference of the one of the sidewall or the tubular sheath with a greater diameter of the oblong opening extending in the circumferential direction.

9. The modular reactor of claim 8 wherein the tube-in-tube dashpot has a lower end cap with a threaded aperture extending axially there through which aligns with the aperture in the lower end plug of the tubular sheath.

10. The modular reactor of claim 9 including a threaded fastener that extends through the bottom nozzle, through the lower end plug of the tubular sheath and into the lower end cap of the tube-in-tube dashpot, attaching the guide thimble and the tube-in-tube dashpot to the bottom nozzle.

11. The modular reactor of claim 10 wherein the aperture in the lower end cap of the tube-in-tube dashpot is threaded and mates with a corresponding thread on the fastener.

12. The modular reactor of claim 8 wherein the opening in the one of the sidewall or the tubular sheath comprises a plurality of circumferentially spaced oblong openings formed approximately at the same elevation.

13. The modular reactor of claim 11 wherein the opening in the one of the sidewall or the tubular sheath comprises two circumferentially spaced oblong openings formed approximately at the same elevation.

14. The modular reactor of claim 8 wherein the opening in the other of the tubular sheath or the sidewall is circular and overlaps a portion of the oblong opening in the one of the sidewall of the tube-in-tube dashpot or the tubular sheath.

\* \* \* \* \*